(12) United States Patent
Birk et al.

(10) Patent No.: US 9,480,237 B2
(45) Date of Patent: Nov. 1, 2016

(54) MILKING PARLOUR FOR ANIMALS

(75) Inventors: Uzi Birk, Huddinge (SE); Thomas Axelson, Farsta (SE)

(73) Assignee: DELAVAL HOLDING AB, Tumba (SE)

( * ) Notice: Subject to any disclaimer, the term of this patent is extended or adjusted under 35 U.S.C. 154(b) by 761 days.

(21) Appl. No.: 13/988,842

(22) PCT Filed: Nov. 16, 2011

(86) PCT No.: PCT/SE2011/051377
§ 371 (c)(1),
(2), (4) Date: May 22, 2013

(87) PCT Pub. No.: WO2012/070999
PCT Pub. Date: May 31, 2012

(65) Prior Publication Data
US 2013/0239897 A1    Sep. 19, 2013

Related U.S. Application Data

(60) Provisional application No. 61/416,357, filed on Nov. 23, 2010.

(30) Foreign Application Priority Data

Nov. 23, 2010    (SE) ..................................... 1051222

(51) Int. Cl.
| A01J 5/017 | (2006.01) |
| A01J 5/003 | (2006.01) |
| A01J 5/007 | (2006.01) |

(52) U.S. Cl.
CPC ................. *A01J 5/017* (2013.01); *A01J 5/003* (2013.01); *A01J 5/007* (2013.01); *A01J 5/0175* (2013.01)

(58) Field of Classification Search
CPC .......... A01J 5/017; A01J 5/003; A01J 5/007; A01J 5/0175; A01K 1/12; A01K 1/123; A01K 1/126

USPC ........... 119/14.04, 14.03, 14.08, 14.02, 14.1, 119/14.18, 14.14
See application file for complete search history.

(56) References Cited

U.S. PATENT DOCUMENTS

| 5,042,428 | A | * | 8/1991 | Van der Lely | ........ | A01J 5/0175 |
| | | | | | | 119/14.08 |
| 5,697,324 | A | * | 12/1997 | van der Lely | .......... | A01J 5/007 |
| | | | | | | 119/14.08 |
| 5,713,301 | A | * | 2/1998 | van der Lely | ........ | A01J 5/0175 |
| | | | | | | 119/14.02 |

(Continued)

FOREIGN PATENT DOCUMENTS

| EP | 0560438 | 9/1993 |
| EP | 0 779 025 | 6/1997 |

(Continued)

OTHER PUBLICATIONS

International Search Report dated Mar. 26, 2012, corresponding to PCT/SE2011/051377.

(Continued)

*Primary Examiner* — Daniel J Troy
*Assistant Examiner* — Hiwot Tefera
(74) *Attorney, Agent, or Firm* — Young & Thompson (57) ABSTRACT

A milking parlor for animals comprising at least one milking stall arranged to receive an animal in a predetermined milking position, teat cups arranged to be used in milking the animal in the milking stall, a teat cup carrier arranged to store the teat cups in the milking stall when they are not used, and at least one robot arm provided with at least one gripping member arranged to grip a teat cup in the teat cup carrier and attach the teat cup on the teat of an animal in the milking stall. The teat cup carrier stores the teat cups in a storing area located at least partly in front of the front legs of the animal with respect to the direction of the animal when it stands in the predetermined milking position in the milking stall.

22 Claims, 4 Drawing Sheets

(56) References Cited

U.S. PATENT DOCUMENTS

| | | | | |
|---|---|---|---|---|
| 5,791,283 A * | 8/1998 | Schulte | ............... | A01J 7/025 119/14.1 |
| 5,842,436 A * | 12/1998 | van der Lely | .......... | A01J 5/007 119/14.08 |
| 5,865,138 A * | 2/1999 | van der Lely | ........ | A01J 5/0175 119/14.02 |
| 6,050,219 A * | 4/2000 | van der Lely | ........ | A01J 5/0175 119/14.04 |
| 6,279,507 B1 * | 8/2001 | van der Lely | ........ | A01J 5/0175 119/14.01 |
| 6,463,877 B1 * | 10/2002 | van der Lely | .......... | A01J 5/017 119/14.01 |
| 6,498,338 B2 * | 12/2002 | Oosterling | ............ | A01J 5/0175 119/14.02 |
| 6,981,467 B2 * | 1/2006 | van der Lely | ........ | A01J 5/0175 119/14.02 |
| 8,109,233 B2 * | 2/2012 | Markusson | ............ | A01J 5/007 119/14.02 |
| 8,171,883 B2 * | 5/2012 | Petterson | ............... | A01J 5/017 119/14.08 |
| 2003/0066488 A1 * | 4/2003 | Fransen | ................... | A01K 1/12 119/14.03 |
| 2005/0000455 A1 * | 1/2005 | Havermans | ........... | A01J 5/0175 119/14.42 |
| 2008/0035063 A1 | 2/2008 | Birk et al. | | |
| 2010/0031889 A1 | 2/2010 | Eriksson et al. | | |
| 2010/0095893 A1 | 4/2010 | Kallen et al. | | |
| 2010/0236485 A1 * | 9/2010 | Axelsson | ............... | A01K 1/126 119/14.02 |
| 2012/0143375 A1 * | 6/2012 | Krukowski | ........... | A01J 5/0175 700/259 |

FOREIGN PATENT DOCUMENTS

| | | |
|---|---|---|
| EP | 2060173 | 5/2009 |
| RU | 1777728 | 11/1992 |
| SU | 954066 | 8/1982 |
| SU | 1158119 | 5/1985 |
| WO | 00/04768 | 2/2000 |
| WO | 2008/118068 | 10/2008 |
| WO | 2010/014002 | 2/2010 |
| WO | 2010/052156 | 5/2010 |

OTHER PUBLICATIONS

Supplemental International Search Report dated Mar. 6, 2013, corresponding to PCT/SE2011/051377.
Swedish Search Report dated May 23, 2011, corresponding to the Foreign Priority Application No. 1051222-6.

* cited by examiner

MILKING PARLOUR FOR ANIMALS

BACKGROUND OF THE INVENTION AND PRIOR ART

The present invention relates to a milking parlour for animals comprising at least one milking stall arranged to receive an animal in a predetermined milking position, teat cups arranged to be used in the milking stall, a teat cup carrier arranged to store the teat cups in the milking stall when they are not used, and at least one robot arm provided with at least one gripping member arranged to grip a teat cup in the teat cup carrier and attach it on the teat of an animal in the milking stall.

In a parallel rotary parlour, the cows normally enter a milking stall via an entrance at the outer edge portion of a rotary platform. The cows stand in a milking position in the milking stalls with their heads at an inner edge portion of the platform and with their rear portions at an outer edge portion of the platform. An operator, or a robot arm, working on the outside of the platform, fetches teat cups in a teat cup magazine and attaches them to the teats of the cow in the milking stall. The teat cup magazine is usually arranged in a position in the vicinity of the outer edge portion of the platform.

If the teat cup magazine is arranged at the side of the milking stall near the outer edge of the platform, the cows have to walk past the teat cup magazine when they enter and when they leave the milking stalls. The milking stalls must here be wider than otherwise needed in order to make room for the teat cup magazines, which restricts the numbers of milking stalls on the platform. In case the teat cup magazine is arranged behind the rear legs of the cow in the milking stall, the teat cups have to be moved through the space between the rear legs of the cow when the teat cups are attached to the teats. There is here a risk that a teat cup will be polluted when it moves through the area below the rear portion of the cow. There is also a risk that the cow stamps on the milk tubes with the rear legs during the milking process.

WO 2008/118068 shows a parallel rotary parlour for automatic milking of cows. A teat cup magazine is arranged on at least one side of the cows in the milking stalls. A robot arm is arranged on the outside of a rotary platform. In order to reach the teat cups in the teat cup magazine and attach them to the teats of the cow, the robot arm extends past the rear legs of the cow, grips the teat cups in the teat cup magazine, and attaches them on the teats of the animal.

SUMMARY OF THE INVENTION

The object of the present invention is to provide a teat cup carrier storing the teat cups in a storing area in a milking stall where they do not risk being damaged by the animal. Further objects are to store the teat cups in an area of the milking stall not used by other components and from which it is possible to move the teat cups to the teats of an animal in a safe and simple manner.

These objects are obtained by the milking parlour initially defined which is characterized in that that the teat cup carrier stores the teat cups in a storing area located at least partly in front of the front legs of the animal with respect to the direction of the animal when it stands in the predetermined milking position in the milking stall. On a rotary platform, the animals normally enter and leave a milking stall at a rear portion of the milking stall. Since the teat cup carrier stores the teat cups in a storing area in front of the front legs of the animal, the animal does not need to walk past the teat cup carrier and the teat cups when it enters and leaves the milking stall. Thereby, the animal does not risk coming in contact with the teat cup carrier and the teat cups in the storing area. The teat cup carrier and the teat cups are thus stored in an area of the milking stall which is safe from damages caused by the animal. Further, the teat cup carrier and the teat cups can here be arranged in an area of the milking stall which is not used by other components. Thus, the existence of the teat cup carrier and the teat cups does not require a larger milking stall. Furthermore, the teat cup carrier stores the teat cups in a storing area from which it is relatively simple to move the teat cups to the teats of the animal. There is substantially no risk that the teat cups will be polluted when they are moved to the teats, since the teat cups are not moved to the teats via an area below a rear portion of the cows. The invention is not limited to the use on a rotary platform, even though the greatest advantages are achieved in such a system.

According to an embodiment of the invention, the teat cup carrier stores the teat cups in a storing area located substantially at a center vertical plane in a longitudinal direction of the milking stall. Preferably, the teat cup carrier stores the teat cups in a completely central position in a transverse direction of the milking stall such that the center vertical plane extends through a center of the storing area. Such a positioning of the storing area facilitates a motion of the teat cups between the front legs of the animals since the animal usually has a central position in the milking stall. The teat cup carrier may store the teat cups in a storing area located on or vertically above a floor surface in the milking stall. Alternatively, the teat cup carrier and the teat cups are stored in a storing area outside the milking stall. In this case, the teat cup carrier and the teat cups may be stored in front of the milking stall.

According to a further embodiment of the invention, the milking parlour comprises a space-creating device having a design creating a free space between the front legs of an animal standing in a milking position in the milking stall. In order to secure a free space for the teat cup carrier when it moves between the front legs of the animal, it is many times suitable to use a space-creating device. The space-creating device may comprise a tunnel-shaped device having at least one opening at an end located behind the front legs of the animal. An animal entering the milking stall then puts the front legs on opposite sides of the centrally arranged tunnel-shaped device. It is possible to place the teat cup carrier and the teat cups in a storing area inside the tunnel-shaped device. In this case, a part of the storing area may be located between the front legs of the animal. The tunnel-shaped device may also have one opening at an end located in front of the front legs of the animal. In this case, the teat cup carrier may store the teat cups in a storing area outside the tunnel-shaped device in a front position of the milking stall. The tunnel-shaped device may be constructed by a strength casing protecting the teat-cup carrier and the teat cups when they are in the storing area and/or when they move between the front legs of the animal. Alternatively, the space-creating device may be an uneven surface arranged between the front legs of an animal standing in a milking position in the milking stall. Animals do not like to stand on uneven surfaces. In this case, the animal puts the front legs on opposite sides of the uneven surface in the milking stall.

According to a further embodiment of the invention, the robot arm is arranged to simultaneously carry at least two teat cups. The robot arm may, for example, comprise one, two or four gripping members. A robot arm with four gripping members may grip four teat cups simultaneously in the teat cup carrier and move them to a position below the teats of the animal. The teat cups may then be attached to a respective teat of the animal in proper order. The robot arm may be arranged to move the gripping member through the space between the rear legs of the animal when it has to grip a teat cup in the teat cup carrier and attach it to a teat of the animal. In this case, the robot arm may be mounted outside the platform in a position behind a rear portion of the animal in the milking stall. Since the teat cup carrier holds the teat cups in a gripping area in front of the rear legs of the animal, the robot arm does not need to move the teat cups through the space between the rear legs of the animal. The robot arm and the gripping member may have a relatively small cross section area making it easy to move the robot arm through the space between the rear legs of the animal.

According to a further embodiment of the invention, the teat cup carrier may comprise at least one rolling member allowing the teat cup carrier to roll along a floor surface in the milking stall between the storing area and the gripping area. In order to provide a stable motion of the teat cup carrier, it is suitable that the teat cup carrier performs a motion in contact with the floor surface in the milking stall. The teat cup carrier may be moved with a low friction along the floor surface by means of such rolling member. The rolling means may for example be a number of suitably placed wheels.

According to a preferred embodiment of the invention, the milking parlour comprises a first positioning means arranged to move the teat cup carrier from the storing area to a gripping area when the teat cups are to be attached to the teats of the animal. The distance between the teats of the animal and the teat cups in the storing area is rather long. In order to facilitate the attachment process of the teat cups and reduce the length of the milk tubes and the pulse tubes connected to the teat cups, it is suitable to move the teat cup carrier to a gripping area located closer to the teats before they are gripped and moved to the teats. Preferably, said gripping area is located between the front legs and the rear legs of the animal when it stands in the predetermined milking position in the milking stall. The teat cup carrier may here be moved through the space between the front legs of the animal to a position relatively close to the teats.

According to a further embodiment of the invention, said first positioning means is arranged to displace the teat cup carrier between the storing area and the gripping area along a rectilinear path. A rectilinear motion may be performed with a relatively simple motion transmission mechanism. The first positioning means may displace the teat cup carrier along the center vertical plane in the longitudinal direction of the milking stall. The front legs of an animal in a milking stall are usually placed on opposite sides of this center plane in the milking stall. Thus, there is usually a free space between the front legs of an animal in this center position of the milking stall which can be used when the teat cup carrier is moved from the storing area to the gripping area. The first positioning means may comprise a power member connected to the teat cup carrier, and a control unit arranged to control the power member, such that it moves the teat cup carrier between the storing area and the gripping area at predetermined occasions. The power member may for example be a hydraulic cylinder or a pneumatic cylinder. The control unit may be a computer or the like comprising a suitable software for the activation of the power member.

According to a further embodiment of the invention, the milking parlour comprises a second positioning means arranged to move the teat cup carrier from the storing area to a manual gripping area when the teat cups are to be manually attached to the teats of the animal. In this case, the teat cup carrier is preferably moved to a position close to the position of an operator and close to the teats of the animal such that it is easy for the operator to grip the teat cups and attach them to the teats of the animal. An extensible power member such as a hydraulic cylinder may be used for moving the teat cup carrier to the manual gripping area.

According to a further embodiment of the invention, the milking parlour comprises a parallel rotary platform, i.e an annular platform where the milking stall is arranged to receive an animal in a predetermined milking position in the milking stall in which the head of the animal is in the vicinity of an inner edge portion of the annular platform, such that a longitudinal axis of the animal has a radial extension on the annular platform. In this case, the robot arm, or an operator, works from a position outside the outer edge portion of the platform when they attach the teat cups to the teats.

According to a preferred embodiment of the invention, the milking parlour comprises a parallel rotary platform, and the first positioning means comprises a stationary rail element arranged radially inside the platform having a control surface defining the position of the teat cup carrier and a transmission mechanism arranged to transmit motions from the control surface of the rail element to the teat cup carrier. The teat cups are usually attached and detached when the milking stall is in specific rotary positions. The control surface of the rail element has a shape moving the teat cup carrier to the storing area or to the gripping area in these specific rotary positions. In this case, the second positioning means may comprise an additional rail element movably arranged to a position in which it replaces an ordinary rail element controlling the motion of the teat cup carrier. Alternatively, the additional rail element and the ordinary rail element are stationary and a rail switching mechanism is used to connect the teat cup carrier to one of these rail elements depending on which area the teat cup carrier is to be moved to.

BRIEF DESCRIPTION OF THE DRAWINGS

In the following, preferred embodiments of the invention are described by examples and with references to the attached drawings, in which.

BRIEF DESCRIPTION OF PREFERRED EMBODIMENTS OF THE INVENTION

Figure 1:
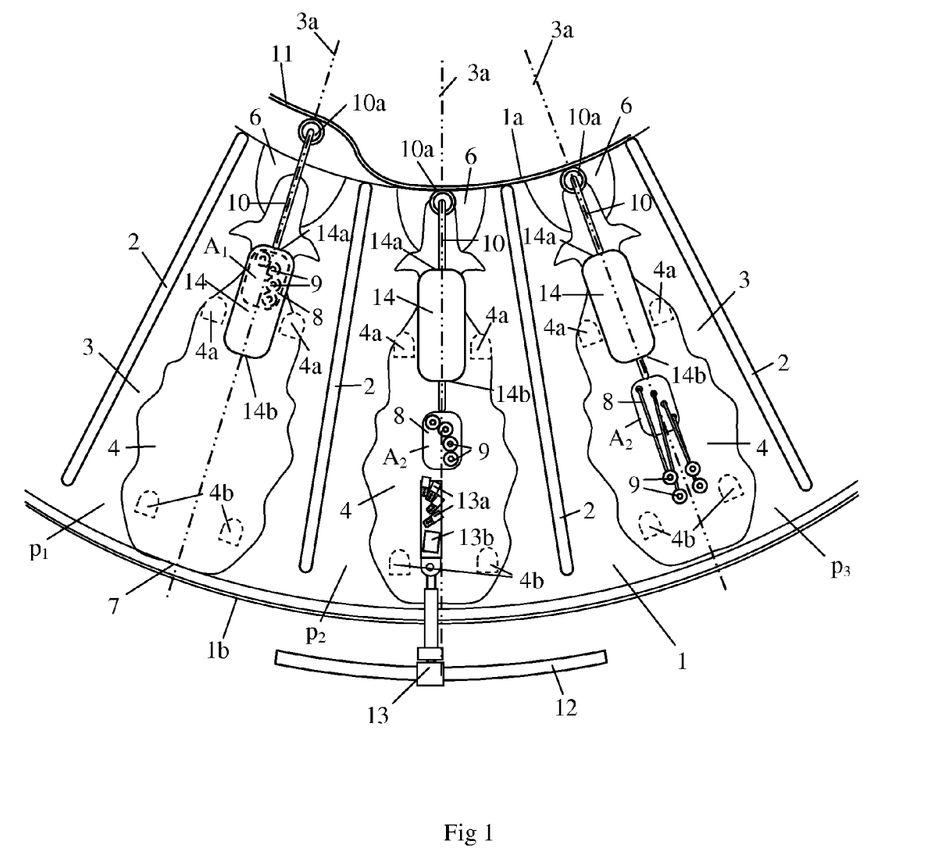
FIG. 1 shows a part of a rotary platform with milking stalls comprising a movable teat cup carrier according to a first embodiment of the invention.

FIG. 1 shows a part of a parallel rotary platform 1. The rotary platform is annular and has an inner edge portion 1a and an outer edge portion 1b. The platform 1 is provided with a plurality of fence elements 2 having an extension in a radial direction on the platform 1. Three milking stalls 3 on the platform 1 are visible in different rotary positions $p_1$, $p_2$, $p_3$. Each milking stall 3 has an extension in a longitudinal direction between a front end portion defined by a part of the inner edge portion 1a of the platform 1 and a rear end portion defined by a part of the outer edge portion 1b of the platform 1. A center vertical plane 3a in the longitudinal direction of the respective milking stalls 3 is marked. The center vertical plane 3a has an extension in a radial direction on the annular platform 1 and it divides the milking stalls 3 in a left half and a right half of the same size. Each milking stall 3 has an extension in a transverse direction between two adjacent fence elements 2.

Cows 4 are standing in the respective milking stalls 3. The positions of the front legs 4a and the rear legs 4b of the cows 4 are indicated when the cows 4 are standing in a predetermined milking position in the milking stalls 3. A longitudinal axis of the cows 4 extends here in radial direction on the annular platform 1 and thus in a corresponding direction as the center vertical plane 3a. The heads of the cows 1 are in the vicinity of the inner edge portion 1a of the platform 1 and the rear end portions of the cows 4 are in the vicinity of the outer edge portion 1b of the platform 1. The cows 4 are here milked in a so called parallel rotary parlour. Each milking stall 3 comprises a movably arranged feeding trough 6. The feeding troughs 6 define the position of the front portions of the cows 4 in the milking stall 3. A rump rail 7 is arranged at a distance above the radial outer edge portion 1b of the platform 1. The rump rail 7 defines the position of the rear portions of the cows 4 in the milking stalls 3.

Each milking stall 3 comprises a movably arranged teat cup carrier 8. Each teat cup carrier 8 stores four teat cups 9 in a storing area $A_1$ when they not are used in the milking stall 3. The storing area $A_1$ is located in front of the front legs 4a of the cow 4 when it is standing in a milking position in the milking stall 3. The storing area $A_1$ has a substantially center position in a transverse direction of the milking stall 3. Thus, the center vertical plane 3a extends centrally through the storing area $A_1$ in the respective milking stalls 3. Each teat cup carrier 8 is movably arranged in the milking stall 3 between the storing area $A_1$ and a gripping area $A_2$ in which it is possible to grip the teat cups 9 and attach them to the teats of the cow 4 in the milking stall 3. The gripping area $A_2$ is located between the front legs 4a and the rear legs 4b of the cow 4. The gripping area $A_2$ also has a center position in a transverse direction of the milking stall 3. Thus, the center vertical plane 3a also extends centrally through the gripping area $A_2$. Each teat cup carrier 8 is connected to a rod element 10 provided with a roller 10a at an end portion. The roller 10a is in contact with a control surface of a rail element 11. The rail element 11 is mounted in a fixed position on the inside of the inner edge portion 1a of the platform 1. A not visible spring member or the like may act on the rod element 10 such that the roller 10a is held in continuous contact with the control surface of the rail element 11. Each teat cup carrier 8 is movably arranged between the storing area $A_1$ and the gripping area $A_2$ by means of this mechanical transmission when the platform 1 rotates.

A robot arm 13 is adapted to fetch the teat cups 9 in the teat cup carrier 8 and attach them to the teats of the cow 4. The teat cups 9 are held in parking positions in the teat cup carrier 8 along a curved path. The robot arm 13 comprises four gripping members 13a. Each gripping member 13a is arranged to grip one of the teat cups 9 in the teat cup carrier 8. The gripping members 13a are arranged on the robot arm along a corresponding curved path as the teat cups 9 in the teat cup carrier 8. Such an arrangement of the gripping members 13a makes it possible to grip the teat cups 9 simultaneously in the teat cup carrier 8. A camera 13b is arranged on the robot arm 13 in the vicinity of the gripping members 13a.

Figure 2:
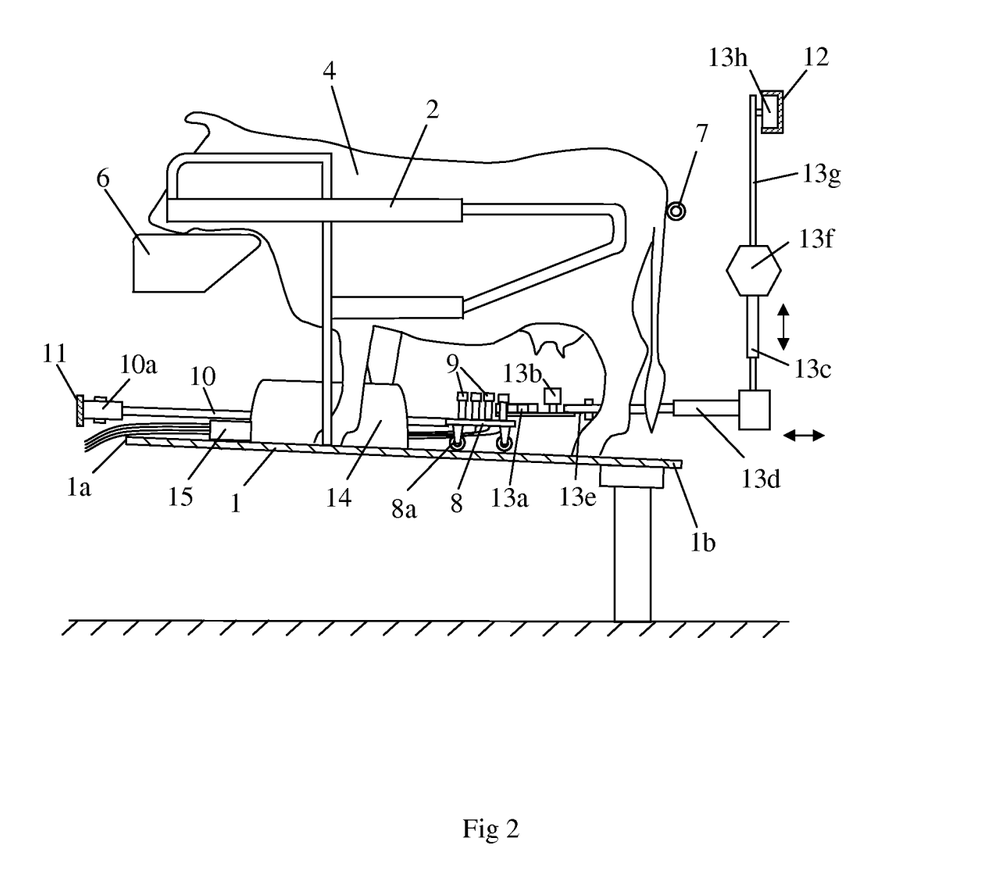
FIG. 2 shows a view from the side of one of the milking stalls in FIG. 1.

FIG. 2 shows the robot arm 13 from the side. In this case, the robot arm 13 comprises a first positioning element 13c arranged to adjust the position of the gripping members 13a in a vertical direction, a second positioning element 13d arranged to adjust the position of the gripping member 13a along a straight line path in a horizontal plane, and a third positioning element 13e arranged to adjust the position of the gripping member 13a in a horizontal plane by means of a pivoting motion. Furthermore, the robot arm 13 comprises a body 13f and a suspension device 13g by which the robot arm 13 is suspended in an overhead rail member 12. The rail member 12 has a curved extension substantially vertically above the radially outer edge portion 1b of the 1 platform 1. The suspension device 13g comprises rollers 13h or the like by which the robot arm 13 is movably arranged along the rail member 12.

Each teat cup carrier 8 is provided with a number of rolling members 8a making it possible for the teat cup carrier 8 to roll along the floor surface in the milking stall 3 between the storing area $A_1$ and the gripping area $A_2$. A tunnel-shaped device 14 is arranged in each milking stall 3. Each tunnel-shaped device 14 is arranged in the vicinity of the front legs 4a of a cow 4 standing in a milking position in the milking stall 3. Each tunnel-shaped device 14 has a center position in the transverse direction of the milking stall 3. Thus, the center vertical plane 3a in the milking stall 3 extends through the tunnel-shaped device 14. The tunnel-shaped devices 14 have a design creating a free space between the front legs 4a of a cow 4. The tunnel-shaped device 14 is constructed by a strength casing. The tunnel-shaped device 14 has an opening at a first end 14a located in front of the front legs 4a of the cow 4. The tunnel-shaped device 14 also has an opening at a second end 14b located behind the front legs 4a of the cow 4. The tunnel-shaped device 14 has here a length such that it encloses the teat cup carrier 8 and the teat cups 9 when they are in the storing area $A_1$.

During operation of the rotary parlour, a cow 4 to be milked enters a milking stall 3 at a first rotation position $p_1$. The existence of the centrally positioned tunnel-shaped device 14 results in the cow 4 having to place the front legs 4a on opposite sides of the tunnel-shaped device 14 in the milking stall 3. The feeding trough 6 is adjusted to a position such that it moves the cow 4 to a predetermined milking position in the milking stall 3 in which an end portion of the cow 4 comes in contact with the rump rail 7. Thereby, the movably arranged feeding trough 6 defines the milking position of the cow 4 in the longitudinal direction of the milking stall 3.

The roller 10a of the rod element 10 rolls continuously in contact with the control surface of the rail element 11. When the milking stall 3 approaches the second rotary position $p_2$, the control surface of the rail element 11 has a curved part displacing the rod element 10 and the teat cup carrier 8 along the center vertical plane 3a of the milking stall. The tunnel-shaped device 14 secures a free space between the front legs 4a of the cow 4 when the teat cup carrier 8 is displaced from the storing area $A_1$ to the gripping area $A_2$.

Initially, the robot arm 13 is located in a resting position radially outside the outer edge portion 1b of the platform 1. When a milking stall 3 enters the second rotary position $p_2$, the first positioning element 13c of the robot arm 13 may be activated in order to adjust the position of the gripping member 13a to a suitable vertical level above the floor surface of the platform 1. The second positioning element 13d then moves the gripping members 10a along a straight line path through the space between the rear legs of the cow 4 and towards the teat cups 9 held by the teat cup carrier 8 in the gripping area $A_2$. The camera 10b detects the positions of the teat cups 9. The above described arrangement of the four gripping devices 13a makes it possible to grip all teat cups 9 simultaneously. The third positioning element 13e may also be used to perform a pivoting motion of the gripping member 13a during the gripping motion of the teat cups 9 in the teat cup carrier 8.

The robot arm 13 is then activated in a manner such that the gripping member 13a moves the teat cups 9 to a position below the udder of the cow 4. The camera 13b detects the positions of the teats of the cow 4 and the robot arm 13 attaches the teat cups 9 in proper order to teat of the cow 4. During the gripping and attaching process of the teat cup 9, the whole robot arm 13 can be moved as a unit along the curved rail member 11 with the same velocity as the platform 1. Thereby, it is possible to avoid mutual motions between the robot arm 13 and the cow 4 on the rotary platform 1. When all teat cups 9 have been attached to the teats of the cow 4, the robot arm 13 is retracted to the resting position outside the radial outer edge portion 13b of the platform 1. In this case, the robot arm 13 uses the space between the rear legs of the cow 4 for gripping the teat cups 9 in the gripping area $A_2$. The gripping members 13a and the robot arm 13 may be given a relatively small cross section area. Thereby, the risk that the robot arm 13 comes in contact with the rear legs 4b of the cow 4 when it moves through the space between the rear legs 4b of the cow 4 is relatively small.

The milking process of the cow 4 starts when the milking stall 3 reaches the third rotation position $p_3$. The teat cup carrier 8 is maintained in the gripping area $A_2$ during the whole milking process. The teat cup carrier 8 is located relatively close to the teats of the cow 4 in the gripping area $A_2$. Such a positioning of the teat cup carrier 8 results in a short pull out length of the milk tubes and the pulse tubes of the teat cups 9 when they are attached to the teats of the cow 4. Thereby, the risk that the tubes become entangled with each other during the milking process and a following removing process is relatively low. As soon as the milking process of the cow 4 has been finished, a schematically disclosed removing device 15 is activated. The removing device 15 is here placed on the floor surface in a front portion of the milking stall 3 in the vicinity of the inner edge portion 1a of the platform 1. In this case, the milk tubes are arranged at a relatively low constant level above the floor surface. Such an arrangement of the milk tubes results in a uniform milk flow from the teat cups 9, via the milk tubes, to a not visible milk container. It is of course possible to arrange the removing device 15 in other positions on the platform 1.

The removing device 15 provides individual pulling forces in the respective milk tubes and the pulse tubes when the milk flow to the respective teats cups 9 ceases. The pulling force in the milk tubes removes the teat cups 9 from the teats of the cow 4 and pulls them back to a parking position in the teat cup carrier 8. When all teat cups have been retracted to the parking position in the teat cup carrier 8, the teat cup carrier 8 is displaced back to the storing area $A_1$ inside the tunnel-shaped device 14 by means of the control surface of the rail element 11 and the rod element 10. Thereafter, the milking stall 3 reaches the final rotary position and the cow 4 leaves the milking stall 3.

Figure 3:
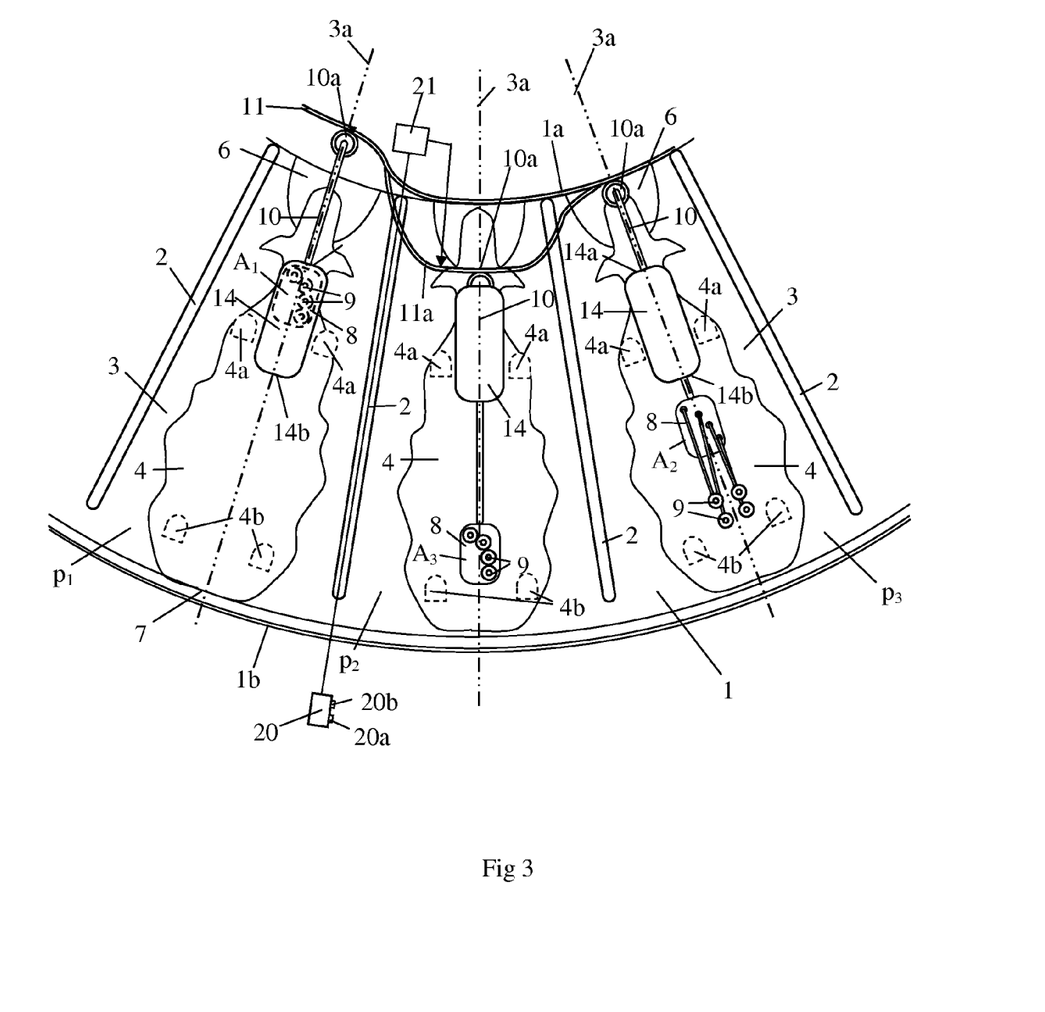
FIG. 3 shows a part of a rotary platform with milking stalls comprising a movable teat cup carrier according to a second embodiment of the invention and, FIG. 4 shows a part of a rotary platform with milking stalls comprising a movable teat cup carrier according to a third embodiment of the invention.

FIG. 3 shows an alternative embodiment comprising a movably arranged additional rail element 11a. The additional rail element 11a is movably arranged between a resting position which may be at a higher level than the level of the ordinary rail element 11 and an active position in front of a part of the ordinary rail element 11. A schematically shown manual control unit 20 of the additional rail element is arranged outside the outer edge portion 1b of the platform 1. The manual control unit 20 is arranged to be used by an operator standing on the outside of the platform 1. In this case, the manual control unit 20 comprises a first button 20a for positioning the additional rail element 11a in the resting position and a second button 20b for positioning the additional rail element 11a in the active position. The manual control unit 20 is connected to a schematically disclosed lifting mechanism 21, able to move the additional rail element 11a in a vertical direction between the resting position and the active position. Alternatively, an operator may directly grip the additional rail element 11a and move it between said positions. According to a further alternative, a simple mechanical mechanism may be used for moving the additional rail element 11a between said positions.

During periods when the robot arm 13 is inoperative, or it is for other reasons decided to manually attach the teat cups, an operator pushes down the second button 20b of the control unit 20. Thereby, the additional rail element 11a is moved down from the resting position to the active position in front of the ordinary rail element 11 with respect to the position of the roller 10a. The roller 10a of the rod element 10 rolls in contact with the ordinary rail element 11 in the first rotary position $p_1$ of the milking stall 3. The roller 10a rolls over from the ordinary rail element 11 to the additional rail element 11a when the milking stall 3 approaches the second rotary position $p_2$. The additional rail element 11a has a control surface with a shape such that it displaces the rod element 10 and the teat cup carrier 8 along the center vertical plane 3a of the milking stall through the tunnel-shaped device 14 and to a manual gripping area $A_3$. The manual gripping area $A_3$ is located closer to the outer edge portion 1b of the platform 1 than the ordinary gripping area $A_2$. It is in this case easy for an operator to grip the teat cups in the teat cup carrier 8 and attach them to the teats of the cow 4 in the milking stall 3.

Thereafter, the additional rail element 11a has a shape such that it displaces the rod element 10 and the teat cup carrier 8 along the center vertical plane 3a of the milking stall 3 from the manual gripping area $A_3$ to the ordinary gripping area $A_2$. The roller 10a rolls back from the additional rail element 11a to the ordinary rail element 11 when the milking stall 3 approaches the second rotary position $p_3$. The teat cup carrier 8 is maintained in the gripping area $A_2$ during the whole milking process. As soon as the milking process of the cow 4 has finished, the teat cups 9 are removed from the cow 4. When all teat cups 8 have been retracted to their parking positions in the teat cup carrier 8, the teat cup carrier 8 is displaced back to the storing area $A_1$ inside the tunnel-shaped device 14 by means of the control surface of the rail element 11 and the rod element 10. The milking stall 3 reaches the final rotary position and the cow 4 leaves the milking stall 3.

It is of course possible to instead maintain the teat cup carrier 8 in the manual gripping area $A_3$ during the milking process.

It is also possible to use a stationary additional rail element for moving the teat cup carrier 8 to the manual gripping area $A_3$. In this case, a rail switching mechanism may be used which in a first position guides the roller 10a to the ordinary rail element 11 and in a second position guides the roller 10a to the alternative rail element. An operator may set the rail switching mechanism in a selected one of these positions by means of a simple mechanical mechanism or a control unit.

Figure 4:
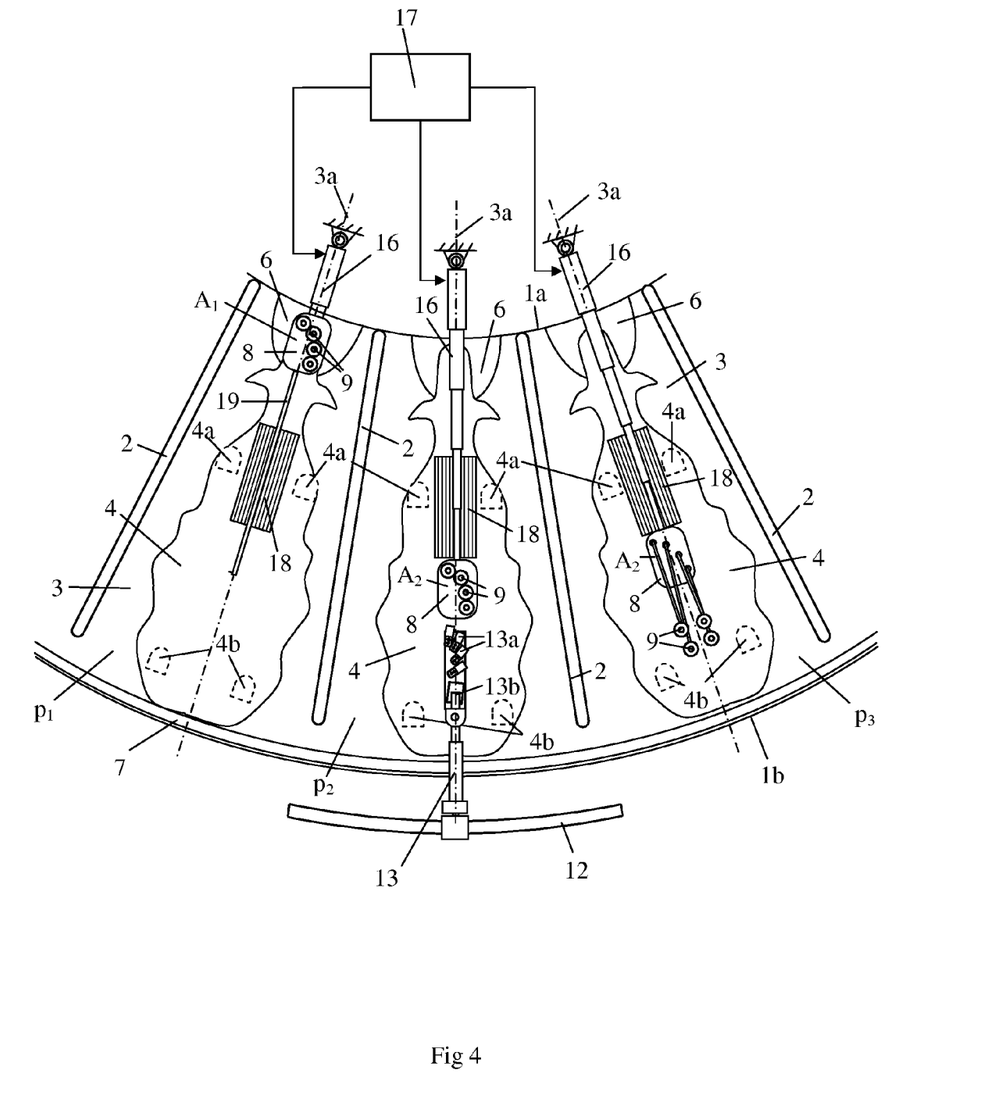

FIG. 4 shows a further alternative embodiment of the invention. In this case, a teat cup carrier 8 is moved between a storing area $A_1$ and a gripping area $A_2$ by means of an extensible power member 16. The extensible power members 16 may be hydraulic or pneumatic cylinders. A control unit 17 is used to control the activation of the power members 16. An uneven surface is arranged between the front legs 4a of the cows 4 in the respective milking stalls 3. In this case, the uneven surface is formed by a number of elongated rib elements 18 arranged in parallel at a distance from each other. Thereby, the uneven surface comprises an upper surface portion defined by the rib elements 18 and a lower surface defined by the ordinary floor surface in the milking stalls 3. Each uneven surface has a center position in the transverse direction of the milking stalls 3. Thus, the center vertical planes 3a in the milking stalls 3 extend through the uneven surfaces. Cows 4 do not like to stand on uneven surfaces. Thereby, the uneven surfaces create free spaces between the front legs 4a of the cows 4 in the milking stalls 3. A guiding track 19 is arranged on the floor surface in each milking stall 3. Alternatively, the guiding track 19 may be formed in a depression in the floor surface or on a level above the floor surface in the milking stalls 3. The guiding tracks 19 define the direction of motion of the teat cup carriers 8 when they are moved between the storing area $A_1$ and the gripping area $A_2$ in the milking stalls 3. Each guiding track 19 extends centrally through the uneven surface in the milking stall 3 in a space between two adjacent rib elements 18.

During operation of the rotary parlour, a cow 4 to be milked enters a milking stall 3 at a first rotation position $p_1$. When the cow 4 enters the milking stall 4, the teat cup carrier 8 is in the storing area $A_1$ in the vicinity of the inner edge portion 1a of the platform 1. Since the teat cup carrier 8 is in this position of the milking stall 3 there is no risk that the cow comes in contact with or stamps on the teat cup carrier 8 and the teat cups 9. The feeding trough 6 moves the cow 4 to the predetermined milking position in the milking stall 3 in which the end portion of the cow 4 is in contact with the rump rail 7. The cow 4 puts the front legs 4a on opposite sides of the uneven surface defined by the rib elements 18 such that a free space is created between the front legs 4a of the cow 4.

When the milking stall 3 approaches the second rotary position $p_2$, the control unit 17 activates the power member 16 such that it displaces the teat cup carrier 8 in a longitudinal direction in the milking stall 3 along the guiding rail 19. The power member 16 displaces the teat cup carrier 8 from the storing area $A_1$ to the gripping area $A_2$ via the free space between the front legs 4a of the cow 4. The control unit 17 activates the robot arm 13 when the milking stall 3 enters the second rotary position $p_2$. The robot arm 13 moves the gripping member 13a towards the teat cups 9 in the teat cup carrier 8 via the space between the rear legs 4b of the cow 4. The gripping device 13a grips all teat cups 9 simultaneously and moves them to a position below the udder of the cow 4 and attaches them in proper order to the teats of the cow 4. The robot arm 13 is then retracted to the resting position outside the radial outer edge portion 13b of the platform 1.

The control unit 17 maintains the teat cup carrier 8 in the gripping area $A_2$ during the whole milking process. As soon as the milking process of the cow 4 has finished, a non-shown removing device removes the teat cup 9 from the teats and pulls them back to a respective parking position in the teat cup carrier 8. Before the milking stall reaches a final rotary position where the cow 4 leaves the milking stall 3, the control unit 17 activates the power member 16 such that it moves the teat cup carrier 8 back to storing area $A_1$. Since the storing area $A_1$ is close to the inner edge portion 1a of the platform there is no risk that the cow 4 comes in contact with or steps on the teat cup carrier 8 and the teat cups 9 when the cow leaves the milking stall 3.

It is also possible to use the extensible power member 16 for moving the teat cup carrier 8 to a manual gripping area $A_3$. It is also possible to use the one of the above mentioned positioning mechanisms for moving the teat cup carrier to a service area on the platform. The teat cup carrier 8 may be moved to the service area during occasions when the platform 1 is free from cows 4. Such a service area may be located close to the outer edge portion 1b of the platform such that the teat cups 9 are easy reachable for an operator standing on the outside the platform 1. In this case, the teat cups 9 may be placed on a cleaning device for performing a cleaning process of the milking system.

The invention is not limited to the described embodiments but may be varied and modified freely within the scope of the claims. The milking parlour is not necessarily a rotary milking parlour, but may be any type of milking parlour, including a so called milking robot (AMS). An operator or a robot arm of any kind may be used for attaching the teat cups to the teats of the cow. The teat cups can be gripped and attached by the gripper individually, in pairs, or all four at once. The space-creating devices may take other forms than the ones described here. It is further not necessary for the platform to comprise fencing between the stalls, feeding troughs and/or rump rails.

The invention claimed is:
1. A milking parlour for an animal, comprising:
a milking stall (3) arranged to receive the animal in a predetermined milking position along a longitudinal direction of the milking stall;
teat cups (9) arranged to be used in milking the animal (4) when the animal is in the predetermined milking position in the milking stall (3);
a space-creating device (14, 18) arranged on a floor surface in the milking stall (3) along the longitudinal direction of the milking stall at a position, when the animal is located in a predetermined milking position (4), in a vicinity of front legs of the animal such that the space-creating device creates a free space between the front legs of the animal, the space-creating device (14, 18) having a forward edge and a rearward edge (15b),
wherein the space-creating device is one of i) a tunnel-shaped device and ii) an elongated ribbed device with an uneven upper surface,
wherein a first surface facing upward toward a underneath side of the animal extends between the forward and rearward edges of the space-creating device,
wherein with the animal in the predetermined milking position, the forward edge is located in front of the front legs of the animal and the rearward edge (15b) is located behind the front legs of the animal and forward of rear legs of the animal;
a movable teat cup carrier (8) storing the teat cups (9) when the teat cups (9) are not in use, the movable teat cup carrier (8) having a forward edge and a rearward edge;

a positioning unit (10, 16) connected to the teat cup carrier (8), the positioning unit (10, 16) operative to displace the teat cup carrier (8) between i) a storing area (A1) and ii) a gripping area (A2) by displacing the teat cup carrier (8) with the the teat cup carrier (8) contacting the first surface below the animal and between the front legs (4a) of the animal along a line running between the front legs and between rear legs of the animal, wherein, when the animal is located in the predetermined milking position (4) in the milking stall (3), the storing area (A1) locates the teat cup carrier (8) below a body of the animal and along the line running between the front legs and between rear legs of the animal, with the teat cup carrier (8) and the teat cups (9) at least partly in front of the front legs (4a) of the animal (4); and a robot arm (13) provided with a gripping member (13a) that, in preparing the animal for the milking, grips a teat cup (9) in the teat cup carrier (8) located in the gripping area (A2) and attaches the gripped teat cup (9) on a teat of the animal.

2. The milking parlour according to claim 1, wherein, when the animal is located in the predetermined milking position (4), the gripping area (A2) locates the teat cup carrier (8) below the body of the animal, along the line running between the front legs and between rear legs of the animal, with the teat cup carrier (8) at least partly in front of rear legs (4b) and at a first distance behind the front legs (4a) of the animal (4).

3. The milking parlour according to claim 2, wherein, the positioning unit (10, 16) is further operative to movably displace the teat cup carrier (8) between i) the storing area (A1) located substantially at a center vertical plane (3a) in the longitudinal direction of the milking stall, ii) the gripping area (A2), and iii) a manual gripping area (A3) by displacing the teat cup carrier (8) below the animal and between the front legs (4a) of the animal, along the line running between the legs of the animal, to a second distance behind the front legs of the animal, the second distance being greater than the first distance.

4. The milking parlour according to claim 2, further comprising:

an additional positioning unit (11a) operative to movably displace the teat cup carrier (8) between i) the storing area (A1), and ii) a manual gripping area (A3) by displacing the teat cup carrier (8) below the animal and between the front legs (4a) of the animal to a second distance behind the front legs of the animal, the second distance being greater than the first distance, wherein the additional positioning unit (11a) is located forward of the front edge of the space-creating device (14, 18).

5. The milking parlour according to claim 1, wherein, the milking stall is located on a parallel rotary platform (1), at least a part of the positioning unit (10, 16) is fixedly mounted radially inward of an inner edge portion of the rotary platform and operatively connected to a forward part of the cup carrier (8), and the robot arm (13) is mounted radially outside of an outer edge portion of the rotary platform and is operative to move, when the animal is located in the predetermined milking position (4), under the animal and between the rear legs of the animal.

6. The milking parlour according to claim 5, wherein, the positioning unit (16) comprises a stationary rail element (11) arranged radially inside the platform, and mounted in a fixed position radially inside of an inner edge portion (1a) of the platform, the rail element (11) having a control surface defining a current position of the teat cup carrier (8) and a transmission mechanism (10, 10a) arranged, as the platform rotates, to transmit motions from the control surface of the rail element (11) to the teat cup carrier (8), thereby controlling displacement of the teat cup carrier (8).

7. The milking parlour according to claim 1, wherein, the space-creating device (14, 18) is the tunnel-shaped device and has a top connected to sides arranged on the floor surface in the milking stall (3) along the longitudinal direction of the milking stall at a position, when the animal is located in a predetermined milking position (4), in a vicinity of the front legs of the animal such that the space-creating device creates a free space between the front legs of the animal, the sides of the space-creating device (14, 18) extending from the forward edge to the rearward edge (15b) and including an opening extending between the sides of the space-creating device (14, 18), the storing area (A1) is located below the space-creating device (14, 18).

8. The milking parlour according to claim 1, wherein the space-creating device is the elongated ribbed device and the first surface is an uneven upper surface upon which the teat cup carrier (8) contacts when the teat cup carrier (8) is displaced between the storing area (A1) and the gripping area (A2).

9. The milking parlour according to claim 1, wherein, the space-creating device is the tunnel-shaped device, and the teat cup carrier (8), in being displaced from i) the storing area (A1) to ii) the gripping area (A2), moves through the tunnel-shaped device.

10. The milking parlour according to claim 1, wherein, the space-creating device is an elongated ribbed device, the elongated ribbed device has a center position in a transverse direction of the milking stall, and the teat cup carrier (8), in being displaced from i) the storing area (A1) to ii) the gripping area (A2), contacting the elongated ribbed device.

11. The milking parlour according to claim 1, wherein, the robot arm (13) is operative to move, when the animal is located in the predetermined milking position (4), under the animal between the rear legs of the animal and is operative to simultaneously carry at least two teat cups (9).

12. The milking parlour according to claim 1, wherein, the positioning unit (16) comprises an extensible power member (16) connected to the teat cup carrier (8) and a control unit (17) arranged to control the power member (16) such that the power unit (16), by extending and contracting a length of the power member (16), displaces the teat cup carrier (8) between the storing area (A1) and the gripping area (A2), wherein the extensible power member (16) is at least party located forward of the front edge of the space-creating device (14, 18).

13. The milking parlour according to claim 1, wherein, the teat cup carrier (8) further comprises at least one rolling member (8a) contacting a floor surface in the milking stall, and when the teat cup carrier (8) is displaced from the storing area (A1) to the gripping area (A2), the rolling member (8a) rolls against the floor surface allowing the teat cup carrier (8) to roll along the floor surface from the storing area (A1) to the gripping area (A2).

14. A milking parlour for an animal, comprising:
parallel rotary platform (1);
a milking stall (3) arranged on the parallel rotary platform (1), to receive the animal in a predetermined milking position along a longitudinal direction of the milking stall;
teat cups (9) arranged to be used in milking the animal (4) when the animal is in the predetermined milking position in the milking stall (3);
a space-creating device (14, 18) arranged on a floor surface in the milking stall (3) along the longitudinal direction of the milking stall at a position, when the animal is located in a predetermined milking position (4), in a vicinity of front legs of the animal such that the space-creating device creates a free space between the front legs of the animal, wherein with the animal in the predetermined milking position, a rearward end part of the space-creating device is located behind the front legs of the animal and forward of rear legs of the animal;
a movable teat cup carrier (8) storing the teat cups (9) in a storing area (A1) when the teat cups (9) are not in use; and
a positioning unit (10, 16) mounted radially inward of an inner edge portion of the rotary platform and extending to a forward part of the cup carrier (8), the positioning unit (10, 16) operative to displace the teat cup carrier (8) from the storing area (A1) to a gripping area (A2) by displacing the teat cup carrier (8), with the teat cup carrier (8) contacting a floor surface in the milking stall, rearwardly below the animal, from the space-creating device (14, 18) to the gripping area (A2) the teat cup carrier (8); and
wherein, when the animal is located in the predetermined milking position (4) in the milking stall (3), the storing area (A1) of the teat cup carrier (8) is below a body of the animal and located along a line running between the front legs and between rear legs of the animal, with the teat cup carrier (8) at least partly in front of the front legs (4a) of the animal (4); and
a robot arm (13) provided with a gripping member (13a) that, in preparing the animal for the milking, grips a teat cup (9) in the teat cup carrier (8) and attaches the gripped teat cup (9) on a teat of the animal.

15. The milking parlour according to claim 14, wherein the positioning unit (10, 16) is located at least partly forward of the front edge of the space-creating device (14, 18) and connected to the teat cup carrier (8), the positioning unit (10, 16) operative to displace the teat cup carrier (8) from i) the storing area (A1) located substantially at a center vertical plane (3a) in the longitudinal direction of the milking stall (3) to ii) the gripping area (A2) by displacing the teat cup carrier (8) below the animal and between the front legs (4a) of the animal along the line running between the front legs and between rear legs of the animal,
wherein, when the animal is located in the predetermined milking position (4), the gripping area (A2) locates the teat cup carrier (8) below the body of the animal, along the line running between the front legs and between rear legs of the animal, with the teat cup carrier (8) at least partly in front of rear legs (4b) of the animal (4) and behind the front legs (4a) of the animal (4).

16. The milking parlour according to claim 15, wherein, the robot arm (13) is mounted radially outside of an outer edge portion of the rotary platform and is operative to move, when the animal is located in the predetermined milking position (4), under the animal between the rear legs of the animal.

17. The milking parlour according to claim 15, further comprising:
an additional positioning unit (11a) operative to movably displace the teat cup carrier (8) from i) the storing area (A1), to ii) a manual gripping area (A3) by displacing the teat cup carrier (8) below the animal and between the front legs (4a) of the animal along the line running between the front legs and between rear legs of the animal, the manual gripping area (A3) being located at a greater distance than from the front legs than a distance the gripping area (A2) is located from the front legs.

18. The milking parlour according to claim 15,
the positioning unit (16) comprises a stationary rail element (11) arranged radially inside the platform, and mounted in a position radially inside of an inner edge portion (1a) of the platform, the rail element (11) having a control surface defining a current position of the teat cup carrier (8) and a transmission mechanism (10, 10a) arranged, as the platform rotates, to transmit motions from the control surface of the rail element (11) to the teat cup carrier (8), thereby controlling displacement of the teat cup carrier (8).

19. The milking parlour according to claim 14, wherein, the space-creating device is a tunnel-shaped device, and the teat cup carrier (8), in being displaced between i) the storing area (A1) and ii) the gripping area (A2), moves through the tunnel-shaped device.

20. The milking parlour according to claim 14, wherein, the space-creating device is an elongated ribbed device, the elongated ribbed device has a center position in the transverse direction of the milking stall, and
the teat cup carrier (8), in being displaced between i) the storing area (A1) and ii) the gripping area (A2), moves over the elongated ribbed device.

21. The milking parlour according to claim 14, wherein, the teat cup carrier (8) further comprises at least one rolling member (8a) contacting a floor surface in the milking stall, and
when the teat cup carrier (8) is displaced from the storing area (A1) to the gripping area (A2), the rolling member (8a) rolls against the floor surface allowing the teat cup carrier (8) to roll along the floor surface from the storing area (A1) to the gripping area (A2).

22. A milking parlour for an animal, comprising:
a milking stall (3) arranged to receive the animal in a predetermined milking position along a longitudinal direction of the milking stall;
teat cups (9) arranged to be used in milking the animal (4) when the animal is in the predetermined milking position in the milking stall (3);
a movable teat cup carrier (8) storing the teat cups (9) in a storing area (A1) when the teat cups (9) are not in use,
wherein, when the animal is located in the predetermined milking position (4) in the milking stall (3), the storing area (A1) of the teat cup carrier (8) is below a body of the animal and located along a line running between the front legs and between rear legs of the animal, with the teat cup carrier (8) at least partly in front of the front legs (4a) of the animal (4); and
a robot arm (13) provided with a gripping member (13a) that, in preparing the animal for the milking, grips a teat cup (9) in the teat cup carrier (8) and attaches the gripped teat cup (9) on a teat of the animal;

a positioning unit (10, 16) connected to the teat cup carrier (8), the positioning unit (10, 16) operative to displace the teat cup carrier (8) from i) the storing area (A1) located substantially at a center vertical plane (3*a*) in the longitudinal direction of the milking stall (3) to ii) a gripping area (A2) by displacing the teat cup carrier (8) below the animal and between the front legs (4*a*) of the animal along the line running between the front legs and between rear legs of the animal, wherein, when the animal is located in the predetermined milking position (4), the gripping area (A2) locates the teat cup carrier (8) below the body of the animal, along the line running between the front legs and between rear legs of the animal, with the teat cup carrier (8) at least partly in front of rear legs (4*b*) of the animal (4) and behind the front legs (4*a*) of the animal (4), wherein, the milking stall is located on a parallel rotary platform (1), wherein, the positioning unit (16) comprises a stationary rail element (11) arranged radially inside the platform, the rail element (11) having a control surface defining a current position of the teat cup carrier (8) and a transmission mechanism (10, 10*a*) arranged to transmit motions from the control surface of the rail element (11) to the teat cup carrier (8), thereby controlling displacement of the teat cup carrier (8), the teat cup carrier (8) further comprises at least one rolling member (8*a*) contacting a floor surface in the milking stall, and when the teat cup carrier (8) is displaced from the storing area (A1) to the gripping area (A2), the rolling member (8*a*) rolls against the floor surface allowing the teat cup carrier (8) to roll along the floor surface from the storing area (A1) to the gripping area (A2).

* * * * *